United States Patent Office 2,951,835
Patented Sept. 6, 1960

2,951,835

PROCESS FOR TREATING HYDROCARBON PHOSPHORUS SULFIDE REACTION PRODUCTS

Herman D. Kluge, Fishkill, Jackson W. Wisner, Jr., Wappingers Falls, and Roger G. Lacoste, Glenham, N.Y., assignors to Texaco Inc., a corporation of Delaware No Drawing. Filed Sept. 29, 1958, Ser. No. 763,812

12 Claims. (Cl. 260—139)

This invention relates to an improved process for preparing phosphorus sulfide-hydrocarbon reaction products. More particularly, this invention is directed to the use of synthetic adsorbents to remove inorganic phosphorus acids from hydrolyzed phosphorus sulfide-hydrocarbon reaction products.

Metal salts formed by neutralization of phosphorus sulfide-hydrocarbon reaction products are known to be excellent motor oil additives wherein they act as detergents and dispersants. The preparation of neutralized phosphorus sulfide-hydrocarbon reaction products and their use in lubricant compositions are disclosed in U.S. Patents 2,316,080 and 2,316,082 which issued April 6, 1943, to C. M. Loane et al.

When metal-hydrocarbon-phosphorus sulfide-containing lubricants were employed in high temperature lubrication, it was discovered that high wear and engine deposits were occasionally encountered. Investigation revealed that the undesirable wear and engine deposits were caused by the presence of salts of inorganic phosphorus acids formed during the neutralization of the phosphorus sulfide-hydrocarbon reaction products. U.S. 2,688,612 which issued September 7, 1954, to R. W. Watson, disclosed that a substantial improvement in the quality of the metal-hydrocarbon-phosphorus sulfide reaction product was obtained by treating the hydrolyzed phosphorus sulfide-hydrocarbon reaction product prior to neutralization with an alkaline adsorbent clay whereby inorganic phosphorus acids formed during the hydrolysis were removed. Alkaline adsorbent clays employed in the afore-identified patent for removal of inorganic phosphorus acids are fuller's earth, diatomaceous earth, bentonite, magnesite, bauxite and Attapulgus clay.

In our copending application, Serial No. 750,874 filed July 25, 1958, of which the subject application is a continuation-in-part, there is set forth the discovery that synthetic hydrous alkaline earth and magnesium silicates are substantially superior to the alkaline adsorbent clays of the Watson patent for removing inorganic phosphorus acids from hydrolyzed phosphorus sulfide-hydrocarbon reaction products. The subject invention involves the discovery that synthetic hydrous alkali metal silicates are also superior to the alkaline adsorbent clays of the Watson patent in treating hydrolyzed phosphorus sulfide-hydrocarbon reaction products, and in addition, yield products which are more fluid than those resulting from the use of the synthetic alkaline earth metal and magnesium silicates, as disclosed in the parent application.

In accordance with the present invention, a hydrolyzed hydrocarbon-phosphorus sulfide reaction product is contacted with a synthetic hydrous alkali metal silicate at a temperature between 100 and 500° F. to remove inorganic phosphorus acids formed during hydrolysis. Hydrolysis of the phosphorus sulfide-hydrocarbon reaction product and adsorption of the inorganic phosphorus acids by the synthetic hydrous alkali metal silicate may be effected in a one-step operation. Neutralization of the hydrolyzed phosphorus sulfide-hydrocarbon reaction product, which has been contacted with synthetic hydrous alkali metal silicates in accordance with the process of the invention, gives a lubricant additive which is characterized by wear-free and deposit-free performance and which processes easily during manufacture because of its fluid nature.

The synthetic alkali metal silicates effective in the process of the invention are hydrous sodium silicate, hydrous potassium silicate and hydrous lithium silicate. Hydrous sodium and potassium silicates are generally employed because of their lower cost and availability.

It is necessary that the synthetic alkali metal silicates be hydrous in nature, that is, retain water of hydration, to be effective in removing inorganic phosphorus acids from hydrolyzed phosphorus sulfide-hydrocarbon reaction products. Anhydrous synthetic alkali metal silicates are ineffective in separating inorganic phosphorus acids from the hydrolyzed phosphorus sulfide-hydrocarbon reaction product.

The synthetic hydrous alkali metal silicates differ from the naturally-occurring alkaline adsorbent clays of the Watson Patent 2,688,612 in chemical composition and in their substantial freedom from iron, which is found in trace amounts in substantially all adsorbent clays. It has been theorized that the superiority of the synthetic hydrous alkali metal silicates over the prior art natural clays is due at least in part to the absence of trace amounts of iron in the synthetic hydrous alkali metal silicates.

The advantages of using synthetic alkali metal silicates in the treatment of hydrolyzed hydrocarbon phosphorus-sulfide reaction products are the following:

First, the colors of both the hydrolyzed phosphorus sulfide-hydrocarbon reaction product and the salt obtained on neutralization thereof are significantly improved employing synthetic hydrous alkali metal silicates in place of alkaline adsorbent clays.

Secondly, synthetic hydrous alkali metal silicates are more efficient in removing inorganic phosphorus acids from hydrolyzed phosphorus sulfide-hydrocarbon reaction products than the prior art adsorbent clays. This advantage permits smaller dosages of adsorbent in the treating step and also permits combination of the hydrolysis and adsorbent treating step into one operation.

Thirdly, synthetic hydrous alkali metal silicates yield a product which on conversion to the metal salt is much more fluid than the salt obtained from the hydrolyzed product treated either with the adsorbent clays of the prior art or with the synthetic hydrous alkaline earth metal or magnesium silicates of the afore-identified copending parent application. The salts of hydrolyzed hydrocarbon-phosphorus sulfide reaction products treated with synthetic hydrous alkaline earth or magnesium silicates as disclosed in the parent application are much improved from the standpoint of fluidity and ease of filtration than the salts derived from hydrolyzed products treated with alkaline adsorbent clays. However, the use of the synthetic hydrous alkali metal silicates as disclosed in the subject invention produces more fluid lubricating oil concentrates of metal-hydrocarbon-phosphorus sulfide reaction products than those obtained from synthetic hydrous alkaline earth metal or magnesium silicate-treated hydrolyzed hydrocarbon-$P_2S_5$ reaction products. This improvement is particularly important in processing since it permits a more rapid filtration rate and a substantial reduction in processing time.

The dosage of the synthetic hydrous alkali metal silicates employed in the process of the invention is most conveniently expressed as a weight percentage of the phosphorus sulfide reactant which is the source of the inorganic phosphorus acid. It has been discovered that best results are obtained by treating the phosphorus sulfide-hydrocarbon reaction product with an amount of synthetic hydrous silicate equivalent to 20 to 130 weight percent of the phosphorus sulfide reactant. The lower limit of 20 weight percent is necessary to effect removal of the inorganic phosphorus acids formed during hydrolysis and the upper limit is set by practical considerations since higher dosages only create handling problems. The preferred concentration of adsorbent is 35 to 110 weight percent of the phosphorus sulfide reactant.

As disclosed in the afore-identified patents, any liquid hydrocarbon reacts with phosphorus sulfides to form phosphorus and sulfur-containing reaction products. Aliphatic, cycloaliphatic and aryl hydrocarbons as well as alkyl-substituted aryl hydrocarbons and aryl-substituted aliphatic and cycloaliphatic hydrocarbons undergo reaction with phosphorus sulfides to yield phosphorus and sulfur-containing reaction products. Olefinic hydrocarbons are the preferred reactants.

The olefinic reactants are usually of high molecular weight, that is, 12 or more carbon atoms, and are usually obtained by polymerization of low molecular weight olefins. Olefins produced by chlorination and subsequent dehydrochlorination of high molecular weight hydrocarbons in the gas oil and lubricating oil range are also used as the hydrocarbon reactants.

Mono-olefin polymers having average molecular weights between 400 and 10,000 prepared by polymerization of gaseous mono-olefins such as propylene, butylene, isobutylene and the like with Friedel-Crafts type catalysts are the most widely used reagents for reaction with phosphorus sulfide. Copolymers of mono-olefin mixtures such as a propylene-isobutylene copolymer, and an isobutylene-pentene copolymer, also find extensive use in the preparation of phosphorus and sulfur-containing hydrocarbon-phosphorus sulfide reaction products. Copolymers of conjugated dienes and mono-olefins such as copolymers of butadiene and isobutylene, of butadiene and propylene, and of butadiene and pentene may also be used as the hydrocarbon reactant.

Olefinic hydrocarbon reactants may also be obtained by cracking of high molecular weight hydrocarbon fractions such as lubricating oil and paraffin waxes in the presence of solid cracking catalysts.

Although phosphorus sulfides such as $P_4S_5$, $P_4S_3$ and $P_4S_7$ are reacted with hydrocarbons to form phosphorus and sulfur-containing reaction products usable in the process of the invention, phosphorus pentasulfide, $P_2S_5$, is used in substantially all commercial preparations because of its availability and cost.

Reaction of the hydrocarbon and the phosphorus sulfide, generally $P_2S_5$, is effected at a temperature from about 150 to 600° F. and usually at a temperature between 300 and 500° F. Advantageously, the reaction is effected under a blanket of an inert gas, for example, in an atmosphere of nitrogen. The phosphorus pentasulfide reagent is employed in an amount between 5 to about 40 weight percent of the hydrocarbon reactant. On a molar basis, the hydrocarbon and phosphorus pentasulfide are usually present in the reaction mixture in amounts between 1 to 3 mols of hydrocarbon per mol of phosphorus pentasulfide. We have found that the preferred mol ratio of hydrocarbon to phosphorus pentasulfide is 1 to 2 mols of hydrocarbon per mol of $P_2S_5$.

When the reaction of the phosphorus pentasulfide and the hydrocarbon is complete, a diluent oil is usually added thereto prior to hydrolysis of the reaction product and its treatment with the synthetic hydrous alkali metal silicate adsorbent. Since the $P_2S_5$-hydrocarbon reaction product after hydrolysis and adsorbent treating is usually neutralized to give a lubricating oil additive, a lubricating oil fraction, advantageously a paraffin base lubricating oil, is generally employed as the diluent. Other hydrocarbon fractions such as kerosene and gas oil fractions can be used as diluents, but their use necessitates a subsequent separation step if the neutralized $P_2S_5$-hydrocarbon reaction product is employed as a lubricant additive.

Hydrolysis of the $P_2S_5$-hydrocarbon reaction product is effected by contact with steam at a temperature between 240 and 550° F. and preferably at a temperature between 350 and 450° F.

The treatment of the hydrolyzed reaction product with synthetic hydrous alkali metal silicates is effected either subsequent to the hydrolysis step or in conjunction therewith.

In the modification involving simultaneous hydrolysis and adsorbent contact, 20 to 120 weight percent synthetic hydrous alkali metal silicate based on the weight of $P_2S_5$ reactant is mixed with the lubricating oil concentrate of $P_2S_5$-hydrocarbon reaction product and temperature raised to 240–450° F. Steam is passed through the slurry of adsorbent and lubricating oil concentrate of reaction product until the reaction mixture shows constant acidity. The passage of steam through the adsorbent-containing lubricating oil concentrate provides the desired mixing for efficient contact. The preferred temperature range for the simultaneous hydrolysis-adsorbent treating operation is 300 to 400° F.

If the treatment with synthetic hydrous alkali metal silicate is effected as a separate step subsequent to the hydrolysis, the hydrolyzed reaction product is contacted with an amount of adsorbent similar to that used in the above-described simultaneous operation and the mixture agitated by steam or with an inert gas at a temperature between 100 and 500° F. and preferably 200 to 400° F. until a product of constant acidity is produced.

Drying of the synthetic hydrous alkali metal silicate-treated hydrolyzed reaction product is simply effected by passing a stream of an inert gas such as nitrogen therethrough at a temperature between about 220 and 400° F. Filtration of the slurry of adsorbent and lubricating oil concentrate of hydrolyzed $P_2S_5$-hydrocarbon reaction product effects removal of the inorganic phosphorus acids formed during hydrolysis.

The filtrate obtained after separation of adsorbent can be used as a lubricating oil additive per se but is normally neutralized with an alkali metal or alkaline earth metal basic compound to form a metal-hydrocarbon-$P_2S_5$ reaction product characterized by excellent detergent and dispersant properties and freedom from objectionable wear and deposit formation.

The process of the invention is illustrated in the following examples:

EXAMPLE 1

A polybutylene-$P_2S_5$ reaction product was prepared by reacting polybutylene having an average molecular weight of about 700 and $P_2S_5$ in a ratio of 1.1 moles of olefin per mol of $P_2S_5$ and in the presence of sulfur in an amount equal to 0.5 weight percent polybutylene. The reaction was effected at 450° F. for four hours in a nitrogen atmosphere and the product was then diluted with a paraffin base distillate having an SUS at 100° F. of about 100 in an amount equivalent to the weight of the polyolefin reactant.

A portion of this lubricating oil concentrate was steamed at 375° F. for four hours in a nitrogen atmosphere and then dried by passage of nitrogen therethrough. The hydrolyzed product had a neutralization No. of 56.3 and contained about 2500 g. of steamed acid. This product was then treated with 250 g. of synthetic hydrous calcium silicate equivalent to about 113 weight percent of the $P_2S_5$ reactant at a temperature of 300° F. The mixture of concentrate and adsorbent was stirred for one hour under a nitrogen atmosphere. On filtration, there was obtained a clear concentrate having a neutralization No. of 18.2 and an ASTM diluted color of 2½ —.

1 mol of the hydrous calcium silicate-treated product was converted to its barium salt by reaction with 3.2 mols of barium oxide and 16.3 mols of water under reflux for ½ hour. 24.4 mols of methyl Cellosolve was then added and the temperature raised to 325° F. to remove water and methyl Cellosolve. At 325° F. the reaction mixture was steamed for ½ hour followed by $CO_2$ blowing until dried. The reaction product filtered rapidly to give a wine red concentrate having an estimated ASTM diluted color of 4.5—; the product analyzed 14.5 percent barium and had a $CO_2$ concentration of 3.01 percent.

EXAMPLE 2

Another portion of the hydrolyzed olefin-$P_2S_5$ product produced in Example 1 having a neutralization No. of 56.3 and containing about 2500 gms. of steamed acid was treated with 173 gms. of synthetic sodium silicate added portionwise over 5 hrs. equivalent to about 78 weight percent of the $P_2S_5$ reactant at a temperature of 300° F. and a mixture of concentrate and sodium silicate stirred for five hours under a nitrogen atmosphere. On filtration there was obtained a clear concentrate having a neutralization No. of 23.9 and an ASTM diluted color of 3—.

1 mol of the hydrous sodium silicate-treated product was converted to its barium salt by the same procedure set forth in Example 1 for the conversion of the calcium silicate-treated product. The dried reaction product filtered very rapidly to give a concentrate having an estimated ASTM color of 4–4.5. This product, which analyzed 15.6% barium and 3.09% $CO_2$, had a kinematic viscosity of 190.8 cs. at 210° F.

EXAMPLE 3

Another portion of the hydrolyzed olefin-$P_2S_5$ product produced in Example 1 and having a neutralization No. of 56.3 and containing about 2000 gms. of steamed acid, was treated with 230 gms. of synthetic hydrous potassium silicate equivalent to about 130 weight percent of the $P_2S_5$ reactant at a temperature of 300° F. The mixture of concentrate and potassium silicate was stirred for one hour under a nitrogen atmosphere. The mixture was then steamed for two more hours while still maintaining a nitrogen atmosphere at 300° F. The mixture was then dried by nitrogen blowing at 300° F. for about 2½ hours. On filtration there was obtained a clear concentrate having a neutralization No. of 30.1 and an ASTM diluted color of 3½—.

1 mol of the potassium silicate-treated product was converted to its barium salt by a procedure identical with that described in Example 1 for the conversion of the calcium silicate-treated product. The dried product filtered rapidly to give a concentrate having an estimated ASTM diluted color of about 4.5. The product, which analyzed 15.12% barium and 3.65 $CO_2$, had a kinematic viscosity of 164.6 cs. at 210° F.

In the following table the data from the foregoing examples are summarized in tabular form.

The foregoing examples demonstrate that treatment of hydrolyzed olefin-$P_2S_5$ products with synthetic hydrous alkali metal silicates yields products which are converted to more fluid concentrates of metal olefin-$P_2S_5$ salts than similar treatment with the synthetic hydrous alkaline earth metal silicates and magnesium silicate of the parent application. The superiority of the synthetic hydrous magnesium and alkaline earth metal silicates over naturally-occurring clays in the treatment of hydrolyzed olefin-$P_2S_5$ products is shown in the data contained in the parent application.

The more fluid product obtained in the process of the invention is highly desirable since it substantially reduces the processing time required for production. An additional advantage resides in the fact that the blending of the fluid barium-olefin-$P_2S_5$ salt produced in the process of the invention with other additives such as zinc dialkyl dithiophosphates to yield premium motor oils is greatly simplified.

Obviously, many modifications and variations of the invention as hereinbefore set forth may be made without departing from the spirit and scope thereof and, therefore, only such limitations should be imposed as are indicated in the appended claims.

Table 1
ADSORBENT TREATMENT OF HYDROLYZED OLEFIN-$P_2S_5$ PRODUCTS HAVING NEUTRALIZATION NO. OF 56.3

| Adsorbent | Dosage, Wt. Percent $P_2S_5$ | Time, Hrs. | Neut. No.— Adsorbent-Treated Product | Color, ASTM Diluted [b] | | Filtration of Barium Salt Concentrate | Kinematic Vis., cs./ 210° F. |
|---|---|---|---|---|---|---|---|
| | | | | Adsorbent-Treated Product | Over-Based Barium Salt | | |
| Calcium Silicate (Example 1) | 108 | 1 | 18.2 | 2½— | 4.5— | Rapid | 672.9 |
| Sodium Silicate (Example 2) | 75 | 2 | 24.2 | 3— | [a] 4— | Excellent | 190.8 |
| Potassium Silicate (Example 3) | 124 | 3 | 30.1 | 3½— | 4.5 | Excellent | 164.6 |

[a] Estimated.
[b] ASTM Method D155–45T.

We claim:

1. In a process for preparing a phosphorus- and sulfur-containing hydrocarbon by reaction of a phosphorus sulfide with a hydrocarbon and subsequently hydrolyzing the phosphorus sulfide-hydrocarbon reaction product, the improvement which involves contacting the hydrolyzed phosphorus sulfide-hydrocarbon reaction product with a synthetic hydrous alkali metal silicate at a temperature between 100 and 500° F. to remove inorganic phosphorus acids formed during hydrolysis.

2. The improvement described in claim 1 in which said synthetic hydrous silicate is employed in a concentration equivalent to 20–130 weight percent of the phosphorus sulfide reactant.

3. The improvement described in claim 1 in which a hydrolyzed $P_2S_5$-olefin reaction product is contacted with a synthetic hydrous alkali metal silicate.

4. The improvement described in claim 1 in which the hydrolyzed phosphorus sulfide-hydrocarbon reaction product is contacted with synthetic hydrous sodium silicate.

5. The improvement described in claim 1 in which the hydrolyzed phosphorus sulfide-hydrocarbon reaction product is contacted with synthetic hydrous potassium silicate.

6. The improvement as described in claim 1 in which said phosphorus sulfide-hydrocarbon reaction product is contacted with said silicate at a temperature between 200 and 400° F.

7. A process for preparing a metal salt of a phosphorus sulfide-hydrocarbon reaction product which comprises reacting phosphorus sulfide with a hydrocarbon, hydrolyzing the phosphorus sulfide-hydrocarbon reaction product, contacting the hydrolyzed phosphorus sulfide-hydrocarbon reaction product with a synthetic hydrous alkali metal silicate at a temperature between 100 and 500° F. to remove inorganic phosphorus acids formed during hydrolysis and converting said silicate-treated product to a metal salt useful as a lubricating oil additive by reaction with an inorganic basic metal compound.

8. A process according to claim 7 in which $P_2S_5$ is reacted with an olefin polymer and said basic metal compound is an alkaline earth metal compound.

9. A process according to claim 7 in which said hydrolyzed phosphorus sulfide-hydrocarbon reaction product is contacted with said synthetic silicate in an amount equivalent to 20–130 weight percent of said phosphorus sulfide reactant.

10. A process according to claim 7 in which said synthetic silicate is hydrous sodium silicate.

11. A process according to claim 7 in which said synthetic silicate is hydrous potassium silicate.

12. A process according to claim 7 in which said hydrolysis of said phosphorus sulfide-hydrocarbon reaction product and contact with said synthetic silicate are effected simultaneously at a temperature between 240 and 450° F.

References Cited in the file of this patent
UNITED STATES PATENTS

| | | |
|---|---|---|
| 2,647,889 | Watson et al. | Aug. 4, 1953 |
| 2,688,612 | Watson | Sept. 7, 1954 |
| 2,759,920 | Watson et al. | Aug. 21, 1956 |